United States Patent
Gajek (10) Patent No.: US 10,554,385 B2
(45) Date of Patent: Feb. 4, 2020

(54) METHOD FOR PROVIDING ENCRYPTED DATA IN A DATABASE AND METHOD FOR SEARCHING ON ENCRYPTED DATA

(71) Applicant: NEC Laboratories Europe GmbH, Heidelberg (DE)

(72) Inventor: Sebastian Gajek, Berlin (DE)

(73) Assignee: NEC CORPORATION, Tokyo (JP)

( * ) Notice: Subject to any disclaimer, the term of this patent is extended or adjusted under 35 U.S.C. 154(b) by 161 days.

(21) Appl. No.: 15/756,593

(22) PCT Filed: Sep. 4, 2015

(86) PCT No.: PCT/EP2015/070212
§ 371 (c)(1),
(2) Date: Mar. 1, 2018

(87) PCT Pub. No.: WO2017/036547
PCT Pub. Date: Mar. 9, 2017

(65) Prior Publication Data
US 2018/0183571 A1 Jun. 28, 2018

(51) Int. Cl.
*G06F 21/00* (2013.01)
*H04L 9/00* (2006.01)
*G06F 21/60* (2013.01)
*G06F 21/62* (2013.01)
*H04L 9/08* (2006.01)

(52) U.S. Cl.
CPC ............ *H04L 9/008* (2013.01); *G06F 21/602* (2013.01); *G06F 21/6227* (2013.01); *H04L 9/0894* (2013.01)

(58) Field of Classification Search
CPC ... G06F 21/602; G06F 21/6227; H04L 9/008; H04L 9/0894
See application file for complete search history.

(56) References Cited

U.S. PATENT DOCUMENTS

2005/0004924 A1* 1/2005 Baldwin ............. G06F 21/6227

OTHER PUBLICATIONS

Emil Stefanov et al: "Practical Dynamic Searchable Encryption with Small Leakage", International Association for Cryptologic Research,, vol. 20131216:190531, Dec. 9, 2013 (Dec. 9, 2013), pp. 1-15, XP061015218.

(Continued)

*Primary Examiner* — Jeffrey C Pwu
*Assistant Examiner* — Thong P Truong
(74) *Attorney, Agent, or Firm* — Leydig, Voit & Mayer, Ltd.

(57) ABSTRACT

A method for providing encrypted data in a database includes randomly encoding stored information. Each information part having a same part index number is added to a group having the same part index number. A number of secret keys and a tree having a number of nodes are computed. The number of nodes is the same as the number of computed secret keys and vertices between the nodes, such that for each node: one of the computed secret keys is assigned to the node; a tuple of ciphertexts is generated; and a vertex from the node is assigned to a sibling indexed with the part index number with the information part corresponding to the index number of the node. A master secret comprising all computed secret keys is computed, and the encrypted data is provided in form of a database with tuples comprising the ciphertexts and the groups.

15 Claims, 3 Drawing Sheets

(56) References Cited

OTHER PUBLICATIONS

Reza Curtmola et al: "Searchable Symmetric Encryption: Improved Definitions and Efficient Constructions", International Association for Cryptologic Research,, vol. 20110420:005403, Apr. 20, 2011 (Apr. 20, 2011), pp. 1-33, XP061002133.
Seny Kamara et al: "Parallel and Dynamic Searchable Symmetric Encryption", International Association for Cryptologic Research,, vol. 20130603:133214, May 30, 2013 (May 30, 2013), pp. 1-15, XP061007761.
Seny Kamara et al: "Dynamic Searchable Symmetric Encryption", International Association for Cryptologic Research vol. 20120908:161455, Sep. 7, 2012 (Sep. 7, 2012), pp. 1-24, XP061006744.
Melissa Chase et al: "Abstract", Jun. 18, 2015 (Jun. 18, 2015), XP055269947.

\* cited by examiner

METHOD FOR PROVIDING ENCRYPTED DATA IN A DATABASE AND METHOD FOR SEARCHING ON ENCRYPTED DATA

CROSS-REFERENCE TO PRIOR APPLICATIONS

This application is a U.S. National Stage Application under 35 U.S.C. § 371 of International Application No. PCT/EP2015/070212 filed on Sep. 4, 2015. The International Application was published in English on Mar. 9, 2017, as WO 2017/036547 A1 under PCT Article 21(2).

FIELD

The work leading to this invention has received funding from the European Union's Horizon 2020 Programme under grant agreement no 611659.

The present invention relates to a method for providing encrypted data in a database, performed in a memory available to a computing device based on a symmetric key and message homomorphic encryption, said database comprising one or more entries, each entry comprising an information identifier and related stored information, said stored information comprising one or more information parts said parts being indexed by a part index number.

The present invention further relates to a method for searching on encrypted data.

The present invention further relates to a method for updating information of encrypted data.

The present invention even further relates to a computing device, adapted for providing encrypted data in a database, said database comprising one or more entries, each entry comprising an information identifier and related stored information, said stored information comprising one or more information parts said parts being indexed by a part index number.

The present invention even further relates to a system for searching on encrypted data, said system comprising a client and a server storing said encrypted data.

Even further the present invention relates to a non-transitory computer readable medium storing a program causing a computer to execute a method for providing encrypted data in a database, said database comprising one or more entries, each entry comprising an information identifier and related stored information, said stored information comprising one or more information parts, said parts being indexed by a part index number.

Even further the present invention relates to a method, performed on a client, for preparing a searching on encrypted data.

BACKGROUND

A searchable encryption scheme—SSE—enables a party to encrypt a message, index the obtained ciphertext, and at any point in time to efficiently look for the plaintext by issuing a search token encoding a search criterion. In addition, an SSE scheme is called dynamic, if documents or search tags are arbitrarily inserted or deleted from the system. SSE can be used in settings where a party would like to outsource some data while it still wishes to maintain some privacy guarantees. The number of applications that dynamic SSE have is vast. They range from databases with the desiderata of supporting a rich set of operations over a large amount of data, e.g. CryptDB to file systems where tons of users push, pull and delete files, but data is accumulated for a finite period of time.

SUMMARY

In an embodiment, the present invention provides a method for providing encrypted data in a database that is performed in a memory available to a computing device, based on a symmetric key and message homomorphic encryption. The database comprises one or more entries, each entry comprising an information identifier and related information, stored information comprising one or more information parts, the information parts being indexed by part index number. The method comprises, in a step a), randomly encoding each of the stored information. In a step b), each of the information parts in each information having a same part index number is added to a group having the same part index number. In a step c), a number of secret keys is computed, the number of secret keys being based on the size of an information, greater than the size and smaller than the doubled size. In a step d), a tree comprising a number of nodes is computed, the number of nodes being the same as the number of computed secret keys in step c) and vertices between the nodes, such that for each node: one of the computed secret keys is assigned to the node; a tuple of ciphertexts is generated, the number of ciphertexts corresponding to the number of computed secret keys, wherein for providing a ciphertext by encryption, the encryption uses a corresponding secret key and a cleartext common for all nodes; and a vertex from the node is assigned to a sibling indexed with the part index number with the information part corresponding to the index number of the node. In a step e), a master secret comprising all computed secret keys is computed. In a step f), the encrypted data is provided in form of a database with tuples comprising the ciphertexts and the groups.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Problems addressed by embodiments of the invention are the level of security, the supported set of operations one may perform on the data and the efficiency measured in terms of computation and communication.

In at least one embodiment, the present invention provides a method for providing encrypted data in a database, performed in a memory available to a computing device, based on a symmetric key and message homomorphic encryption, said database comprising one or more entries, each entry comprising an information identifier and related information, said stored information comprising one or more information parts, said parts being indexed by part index number, the method comprising the steps of:
- a) Randomly encoding every stored information
- b) Adding every information part in each information having a same part index number to a group having said same part index number,
- c) Computing a number of secret keys, said number being based on the size of an information, greater than said size and smaller than the doubled size,
- d) Computing a tree comprising a number nodes, said number being the same as the number of computed secret keys in step c) and vertices between the nodes, such that
    for each node
        assign one of the computed secret keys to said node,
        generate a tuple of ciphertexts, the number of ciphertexts corresponding to the number of computed secret keys, wherein for providing a ciphertext by encryption, said encryption using a corresponding secret key and a cleartext common for all nodes,
        assign the vertex from said node to a sibling indexed with the part index number with the information part corresponding to the index number of the said node,
- e) Computing a master secret comprising all computed secret keys,
- f) Providing the encrypted data in form of a database with tuples comprising said ciphertexts and said groups.

In at least one further embodiment, the present invention provides a method for searching on encrypted data, said encrypted data provided according to an embodiment of the present invention, comprising the steps of:
- A) Recovering the random encoding of information to be searched,
- B) Computing a number of secret keys and a number of ciphertexts, said numbers each being equal to the number of information parts of said information to be searched, wherein a ciphertext is obtained by encrypting an information part corresponding to a computed secret key with said computed key, such that each ciphertext is based on a different encryption key and a different information part,
- C) Computing in said tree for every node on the path to the group for said searched information an evaluation key by performing a function of a secret key computed in step B) and a secret key computed in c),
- D) Computing a token for each computed ciphertext and each evaluation key comprising said computed ciphertext and its corresponding evaluation key,
- E) Evaluating the corresponding node of the token by computing a second ciphertext, said second ciphertext being computed by performing said function over corresponding computed ciphertext of step B) and corresponding computed ciphertext of step d),
- F) Decrypting the information part using said ciphertext of B) and said secret keys of B),
- G) Perform step E) and F) for the next node in the tree whose vertex is associated with the information part until a group associated to the information searched, is reached, and
- H) Upon reaching said group, retrieving the ciphertexts with matching identifiers.

In at least one further embodiment the present invention provides a method for updating information of encrypted data provided according to a method according to an embodiment of the present invention, comprising the steps of:
- 1) Performing a search in the encrypted data, said search being performed according to the steps A)-H) above,
- 2) Updating of the information by storing an information index for in the reached group.

In at least one further embodiment the present invention provides a computing device, adapted for providing encrypted data in a database, said database comprising entries, each entry comprising stored information and an information identifier for said stored information, said stored information comprising one or more parts, said parts having an index number Said computing device being adapted to
- a) Randomly encode every stored information,
- b) Add every information part in each information having a same part index number to a group having said same part index number,
- c) Compute a number of secret keys, said number being based on the size of an information, greater than said size and smaller than the doubled size,
- d) Compute a tree comprising a number nodes, said number being the same as the number of computed secret keys in step c) and vertices between the nodes, such that
    for each node
        Assign one of the computed secret keys to said node,
        generate a tuple of ciphertexts, the number of ciphertexts corresponding to the number of computed secret keys, wherein for providing a ciphertext by encryption, said encryption using a corresponding secret key and a cleartext common for all nodes,
        assign the vertex from said node to a sibling indexed with the part index number with the information part corresponding to the index number of the said node,
- e) Compute a master secret comprising all computed secret keys,
- f) Providing the encrypted data in form of a database with tuples comprising said ciphertexts and said groups.

In at least one further embodiment the present invention provides a system for searching in encrypted data, said encrypted data provided according to a method according to an embodiment of the present invention, said system comprising a client and a server storing said encrypted data, said client being adapted to:
- A) Recover the random encoding of information to be searched
- B) Compute a number of secret keys and a number of ciphertexts, said numbers each being equal to the number of information parts of said information to be searched, wherein a ciphertext is obtained by encrypting an information part corresponding to a computed secret key with said computer secret key, such that each ciphertext is based on a different encryption key and a different information part,
- C) Compute in said tree for every node on the path to the group for said searched information an evaluation key by performing a function of a secret key computed in step B) and a secret key computed in c),
- D) Compute a token for each computed ciphertext and each evaluation key comprising said computed ciphertext and its corresponding evaluation keys,
- E) Evaluating the corresponding node of the token by computing a second ciphertext, said second ciphertext being computed by performing said function over corresponding computed ciphertext of step B) and corresponding computed ciphertext of step d), F) Decrypting the information part using said ciphertext of B) and said secret keys of B), G) Perform step E) and F) for the next node in the tree whose vertex is associated with the information part until a group associated to the information searched, is reached, and H) Upon reaching a group, retrieving the ciphertexts with matching identifiers In at least one further embodiment the present invention provides a non-transitory computer readable medium storing a program causing a computer to execute a method for providing encrypted data in a database, performed in a memory available to a computing device, based on a symmetric key and message homomorphic encryption, said database comprising one or more entries, each entry comprising an information identifier and related information, said stored information comprising one or more information parts, said parts being indexed by part index number said method comprising the steps of a) Randomly encoding every stored information b) Adding every information part in each information having a same part index number to a group having said same part index number, c) Computing a number of secret keys, said number being based on the size of an information, greater than said size and smaller than the doubled size, d) Computing a tree comprising a number nodes, said number being the same as the number of computed secret keys in step c) and vertices between the nodes, such that for each node assign one of the computed secret keys to said node, generate a tuple of ciphertexts, the number of ciphertexts corresponding to the number of computed secret keys, wherein for providing a ciphertext by encryption, said encryption using a corresponding secret key and a cleartext common for all nodes, assign the vertex from said node to a sibling indexed with the part index number with the information part corresponding to the index number of the said node, e) Computing a master secret comprising all computed secret keys f) Providing the encrypted data in form of a database with tuples comprising said ciphertexts and said groups. common for all nodes, assign the vertex from said node to a sibling indexed with the part index number with the information part corresponding to the index number of the said node, a) Computing a master secret comprising all computed secret keys b) Providing the encrypted data in form of a database with tuples comprising said ciphertexts and said groups.

In at least one further embodiment the present invention provides a method, performed on a client, for preparing of searching on encrypted data, said encrypted data provided according to a method according to an embodiment of the present invention, comprising the steps of:

A) Recovering random encoding of information to be searched,

B) Computing a number of secret keys and a number of ciphertexts, said numbers each being equal to the number of information parts of said information, and a ciphertext is obtained by encrypting an information part with a computed secret key, such that each ciphertext is based on a different encryption key and a different information part, C) Computing in the binary tree for every node on the path to the group for said information an evaluation key by performing a function of a secret key computed in step B) and a secret key computed in c), D) Computing a token comprising the computed ciphertexts and corresponding evaluation keys.

At least one of the embodiments of the present invention has at least one of the following advantages:

efficiency: For example searching for all files comprising a single keyword is independent of the number of files. Therefore search time is constant bounded by the size of the word dictionary W, i.e. $O(\log(|W|))$.

enhanced functionality. For example searching for all files comprising multiple keywords can be expressed as a Boolean formula of size n, takes search time $O(n*\log(|W|))$.

enhanced dynamicity. Updating and erasing of files require as much time as searching for the files.

enhanced privacy. Searching for all files comprising a word or set thereof leaks no information about the searched information.

enhanced communication efficiency. For example communicating a search and update requires only a single round of communication.

The term "database" is to be understood in the broadest sense and may be represented as a list of identifier/word tuples where every (file) identifier $id_j$, $\epsilon I$ taken form the index set I is associated with j words $\{w_j\}_{j \leq n}$, taken from a word dictionary W.

The term "computing device", or "computing entity", etc. refer in particular in the claims, preferably in the description each to a device adapted to perform computing like a personal computer, a tablet, a mobile phone, a server, or the like and comprises one or more processors having one or more cores and may be connectable to a memory for storing an application which is adapted to perform corresponding steps of one or more of the embodiments of the present invention. Any application may be software based and/or hardware based installed in the memory on which the processor(s) can work on. The computing devices or computing entities may be adapted in such a way that the corresponding steps to be computed are performed in an optimized way. For instance different steps may be performed in parallel with a single processor on different of its cores.

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

The term "group" may refer in particular in the claims, preferably in the description to data or information which is grouped together having at least one feature, piece of data or a part of information in common or being linked with another one. For example said group may comprise indices of files. Another term synonymously used in particular in the claims, preferably in the description in the description is the term "bucket".

For searching of multiple information in said encrypted data multiple tokens may be computed. This enables in an easy way to search for multiple words, i.e. simply by sending multiple search tokens.

For searching of a formula over multiple information first the groups associated with a corresponding information matching every information of said multiple information may be identified and then said formula may be applied over the indices of that identified groups. This enables in an easy way to search over a formula.

One or more dummy indices may be added to a group. This enables to prevent e.g. a server from learning information from the number of indices stored in a group based on frequency patterns or other like. Dummy indices added to groups are a simple and efficient way to provide a differential privacy technique to bias the size of the stored information.

Said tree may be a b-tree or a binary tree wherein case of a binary tree the cleartext is one bit for step d). This enables in an efficient way to provide a simple tree structure. In case of a more general tree structure such as a b-tree each node may be augmented with encryption of multiple bits each referring to a key and message homomorphic encryption scheme supporting messages over finite field.

Step a) may be performed by encoding every information as a pseudo-random function with a random seed and said information. This enables in an efficient way to generate and randomly encode every information.

A pseudo-random function may be used with a randomly chosen seed to generate all secret keys of step c) of a master secret. This reduces the client's storage since the client only needs to store a seed.

Step a) may be performed using bloom filters. This enables to reduce the storage complexity at the server side when bloom filters are used instead of the pseudo-random function. This shrinks the depth of the tree at the cost of false positives when searching for information.

Locally sensitive hashing may be used. This enables to implement range queries or other similarity measures as required, for example for image comparison or the like.

When information is deleted, the group may be deleted associated with information. This allows an efficient way to delete data.

Figure 1:
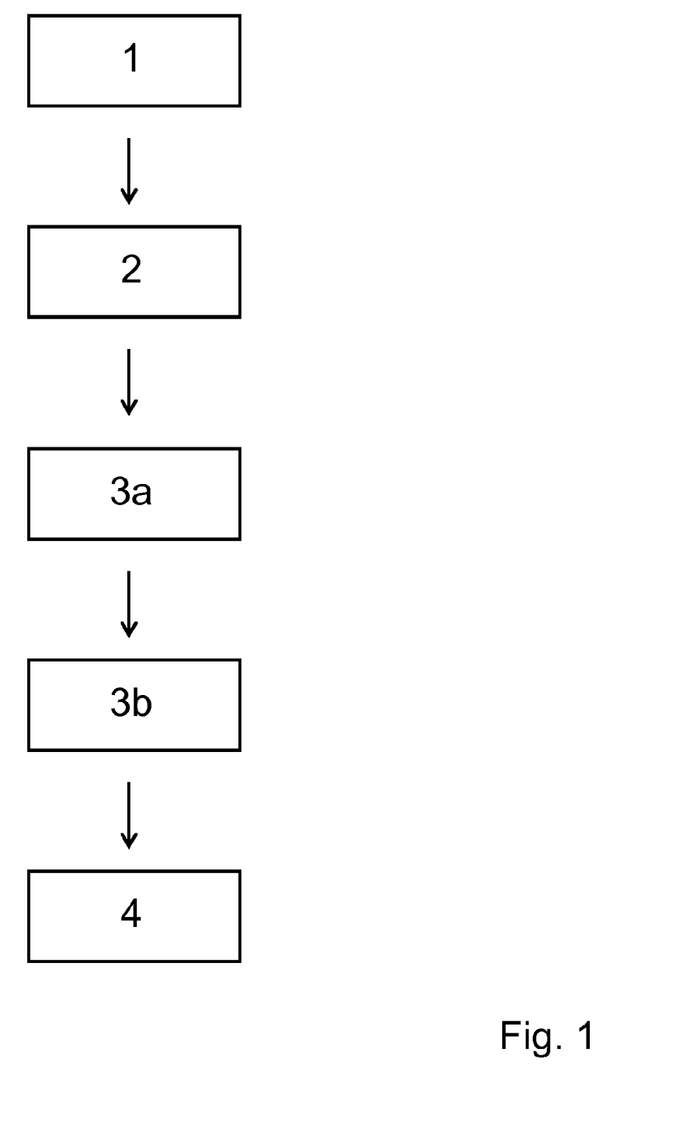
FIG. 1 shows steps of a method according to an embodiment of the present invention.

FIG. 1 shows steps of a method according to an embodiment of the present invention.

In the following a database $DB=((id_i, \{w_j\}_{j \leq n})_{i \leq m})$ is represented as a list of identifier/word tuples where every (file) identifier $id_i$, $\in I$ taken form the index set I is associated with j words $\{w_j\}_{j \leq n}$ taken from a word dictionary W. A search query $\psi(w)=(\psi, w)$ is specified by a tuple of words $w \subseteq W$ and a boolean formula $\psi$ on w. DB ($\psi(w)$) denotes the set of identifiers that satisfy $\psi(w)$. An update query $\Phi(u)$ is parameterized with an update operation u. Updates of the form (add, w, id), (del, w, id) add or remove identifiers id assigned with word w; update operation of the form (add, w, id), (del,w, id) add or remove a list of words w from identifier id. $EDB(\Phi(u))$ denotes the set of identifiers satisfying the update $\Phi(u)$.

In the following embodiments make use of a 1. symmetric key and message homomorphic encryption scheme KMHE:=(Setup, KeyGen, Enc, Dec). Such a scheme has the property that there exists
   (1) a key evaluation generation algorithm EvalKey on input two secret keys $SK_1$, $SK_2$ and a description of function f generates a decryption key $SK_{f(3K, 3K2)}$ and
   (2) a ciphertext evaluation algorithm EvalCtx on input two ciphertexts $C_1$, $C_2$ and a description of a function f generates an evaluated ciphertext, such that for all messages $m_1$, $m_2$ and all keys $SK_1$, $SK_2$ in the support of KeyGen the following holds with overwhelming probability:
   $Dec(EvalKey(f, SK_1, SK_2), EvalCtx(f, Enc(SK_1,m_1), Enc(SK_2,m_2)))=f(m_1,m_2)$ 2. pseudorandom function PRF that on input a seed s and a label outputs a random string.

Further a searchable encryption is used enabling a client to encrypt data in such a way that it can later generate search tokens to send as queries to a storage server. Given a search token, the server can search over the encrypted data and return the appropriate encrypted files. Symmetric searchable encryption systems typically follow a blue print, at least when the system tolerates leakage of access patterns: One first encrypts the data with a scheme supporting pseudorandom ciphertexts and tags ciphertexts with words. Next, one builds up a "cryptographic" data structure with word-identifier pairs. Each identifier points to a ciphertext (or set thereof). Then building a searchable encryption system boils down to designing search mechanisms for the data structure. In embodiments of the present invention searchable encryption with respect to searching for identifiers in a data structure is provided In detail the following is assumed: A dynamic searchable symmetric encryption scheme DSSE comprises three interactive algorithms (Setup,Search, Update) executed e.g. between the client and the server.

Setup($1^\lambda$, DB). On input a security parameter $\lambda$ and a database DB, the protocol outputs a secret key MSK and an encrypted database EDB. The client stores the secret key MSK, whereas the server holds the encrypted database EDB.

Search (MSK, $\psi(w)$, EDB). The protocol is between the client and server, where the client takes as input a secret key MSK and a search query $\psi(w)$ on words w, and the server takes as input the encrypted database EDB. The server outputs a set of identifiers ID$\subseteq$I, the client has no output.

Update(MSK, $\Phi(u)$, EDB). The protocol runs between the client and server, where the client input is a secret key MSK and an update query $\Phi(u)$ on operation u, and the server takes as input the encrypted database EDB. At the end of the interaction, the client terminates with an updated state MSK' and the server with a modified database EDB'.

A DSSE system is non-interactive if Search and Update are two-round protocols.

Further a dynamic symmetric searchable encryption DSSE system is correct, if for all databases DB, all search queries $\psi(w)$, all update queries $\phi(u)$, (MSK, EDB)$\leftarrow$Setup ($1^\lambda$, DB), it holds:

Search correctness: There exists a negligible function $\varepsilon_s$,
s.t. $Pr[Search(MSK, \psi(w), EDB) \neq DB(\psi(w))]=\varepsilon_s(\lambda)$ Update correctness: There exists a negligible function $\varepsilon_u$,
s.t. $Pr[Update(MSK, \phi(u), EDB) \neq EDB(\phi)(u))=\varepsilon_u(\lambda)$ Some embodiments of the present invention have perfect correctness, meaning the odds of search and update queries to be incorrect are 0. However, further embodiments use different encodings of search words (e.g. Bloom filters, locally sensitive hashing, etc.) enabling a reduction of the storage complexity or increase the search functionality at the costs of a growing correctness error.

Figure 3:
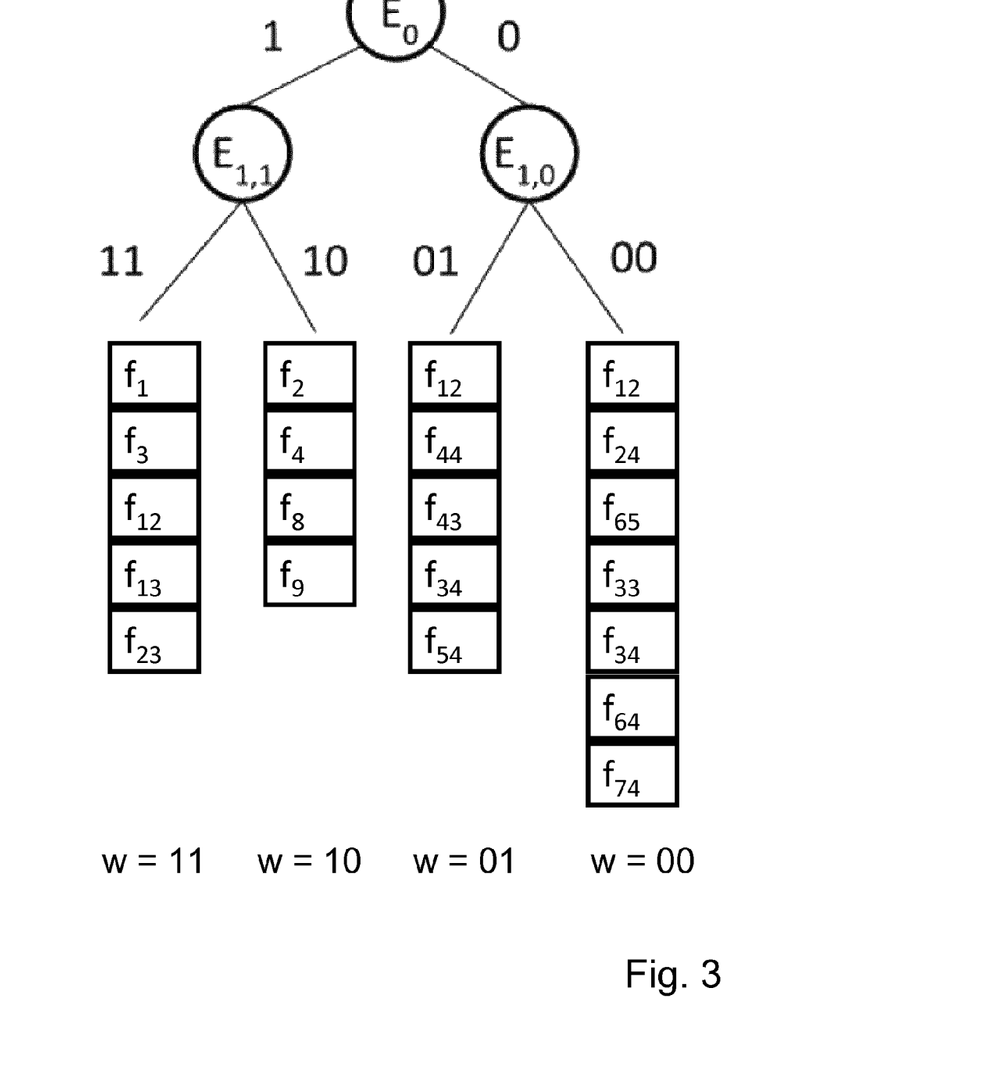
FIG. 3 shows a tree structure generated by a method according to a further embodiment of the present invention.

Embodiments of the present invention build a cryptographic binary tree data structure of word-indices. Each node represents a bit of the search word. Traversing the tree will end up in a bucket containing all files indices matching the desired search word. In FIG. 3 each node associated with the $i^{th}$ bit of the search word $w=(w_0, \ldots, w_{n-1})$ is encoded as an encryption $C_{ij}=\text{Enc}(k_{ij}, m_{ij})$ of some message $m_{ij}$ under key $k_{ij}$. A hint to decide which vertex to choose comprises an encryption $C'_{ij}=\text{Enc}(k'_{ij}, m'_{ij})$ of message $m'_{ij}$ under a random key $k'_{ij}$ and a node-specific decryption key $SK_f(k_{ij}k'_{ij})$ such that $$Dec(EvalKey(f, k_{ij}, k'_{ij}), EvalCtx(f, C_{ij}, C'_{ij})) = \begin{cases} 0 & \text{if } w_i = 0 \\ 1 & \text{if } w_i = 1 \end{cases}$$

Thus, "decrypting" the node provides a hint to the next node. Applying this technique for all sequential nodes enables to traverse the tree efficiently in $O(\log |W|)$ where $|W|$ is the maximal size of a word fixed in advance. The operation f denotes the multiplication over the encryptions of two bits, thus decryption effectively implements the AND of the two bits. One can now search for a word $w=(w_0, \ldots, w_{n-1})$ by encrypting the first ciphertext with a '1' and the second ciphertext with the bit $w_i$. The first ciphertext is stored as the encrypted database at the server, the second ciphertext plus the decryption key is the search token.

In detail now an embodiment of the present invention uses a KMHE=(KeyGen, Enc, Dec, EvalCtx, EvalKey) key and message homomorphic encryption system. W log, assuming here $|W|=2^l$ is a power of 2.

Further a dynamic symmetric searchable encryption system SENC=(Setup, Search, Update) is provided as follows:

Setup($1^\lambda$, DB): On input a security parameter $\lambda$ and a database DB=$((id_i, \{w_j\}_{j \leq 2^l})_{i \leq m})$, build up an encrypted data structure as follows, said steps being shown in FIG. 1:
1. Sample a random seed s and randomly encode every word w as PRF(s, w).
2. For every $w_j \in$ DB, add DB($w_j$) to bucket $b_j$.
3. Sample $N=2^{l+t}-1$ random keys $(SK_1, \ldots, SK_N)$ ←KeyGen($1^\lambda$) and create a binary tree:
   (a) Assign the $i^{th}$ node with a secret key $SK_{i \in (1,N)}$ and generate a tuple of N encryptions $C_i=\text{Enc}(SK_i, 1)$.
   (b) Assign the vertex from the $i^{th}$ node to the $j^{th}$ sibling with the $i^{th}$ bit of the search word.
4. Return the master secret MSK=(s, $SK_1, \ldots, SK_N$) and the encrypted data structure EDB=($\{C_i\}_{1 \leq i \leq N}$, $\{b_j\}_{1 \leq j \leq 2^l}$)

Figure 2:
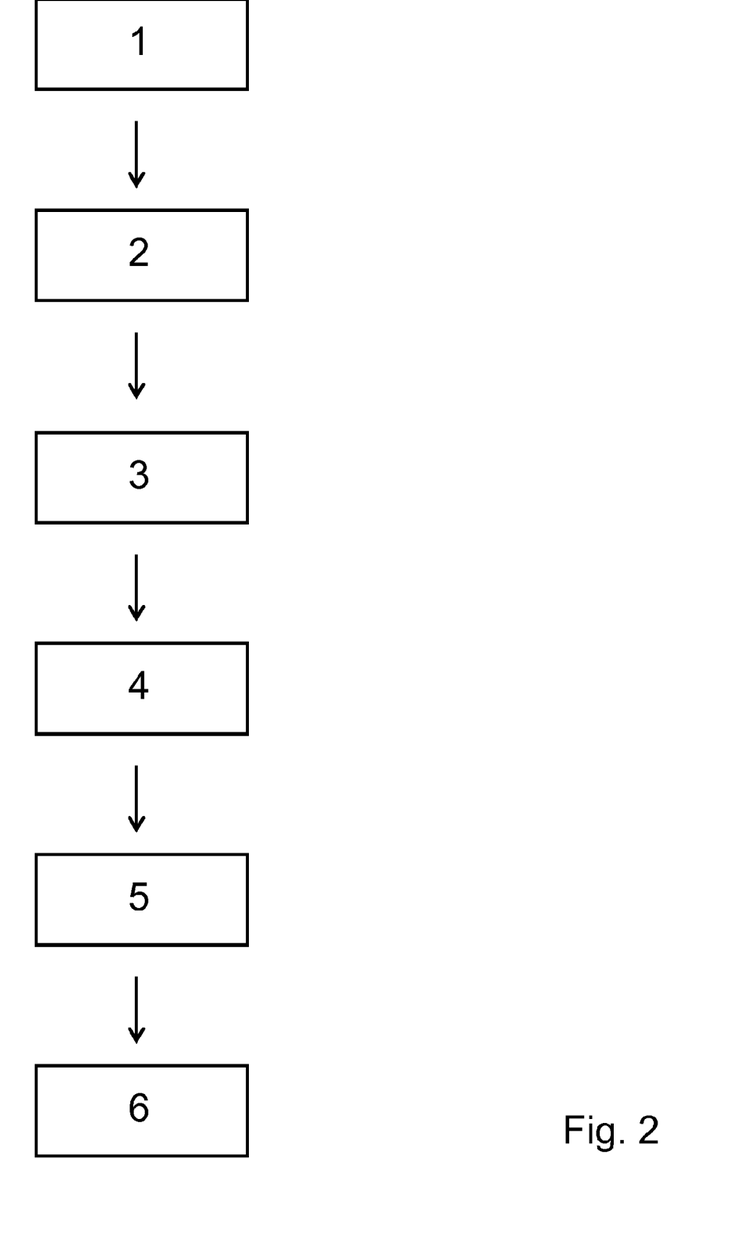
FIG. 2 shows steps of a method according to a further embodiment of the present invention.

Search (MSK, w): To generate a search token $TK_w$ for the f-bit word $w=(w_1, \ldots, w_l)$, the client performs the steps shown in FIG. 2:
1. recovers the random encoding of w by computing PRF(s, w)
2. generates l keys $(SK'_1, \ldots, SK'_l)$←KeyGen($1^\lambda$) and ciphertexts $(C'_1, \ldots, C'_l)$←Enc($SK'_i, w_i)_{i \in (1,l)}$.
3. generates for every node i on the path to the bucket $b_w$ an evaluation key $SK''_i$←EvalKey(f, $SK_i$, $SK'_i$)
4. sends the token TK=($SK''_i, C_i)_{i \in (1,l)}$ to the server.
Upon receiving the token, the server
5. evaluates the $i^{th}$ node by computing $C''_i$←EvalCtx(f, $C_i$, $C'_i$).
6. decrypts the bit b←Dec($SK''_i$, $C''_i$) and traverses to the next node in the tree whose vertex is associated with bit b Once the server reached a bucket, it retrieves the ciphertexts with the matching identifiers.

To add files an update procedure (MSK, $\phi(u)$, EDB) may be performed: To add files to the data structure, one needs to search for the bucket matching the word and store the file index in the bucket. Deletion of files matching a word requires to delete the bucket associated with the word. Deletion of a single file requires the client to decrypt the files and ask the server to delete the index associated with the corresponding ciphertext.

Optionally or additionally to search for multiple keywords, one may send multiple search tokens TK. To search a formula over multiple words, one first searches for the buckets matching every word and then applies the formula over the indices of the buckets.

To reduce the client's storage, one can use a pseudorandom function PRF with a randomly chosen seed to generate all N secret keys of the master secret MSK. Then the client needs to store a seed only.

To prevent the server from learning words from the number of indices stored in a bucket based on frequency patterns, one may apply standard differential privacy techniques to bias the size, e.g. one adds dummy indices to buckets.

To obtain a more general tree structure, such as a b-tree, one can augment each node with encryption of multiple bits which refer to a key and message homomorphic encryption scheme supporting messages over a finite field.

To reduce the storage complexity at the server, one can use Bloom Filters instead of the pseudo-random function. This will shrink the depth of the tree at the costs of false positives.

To implement range queries (or other similarity measures as required for image comparisons, for examples), one can use locally sensitive hashing algorithms.

The following Table 1 shows a comparison between conventional symmetric searchable encryption schemes and an embodiment of the present invention:

TABLE 1

| Scheme | Security | Leakage | Dyn? | Index Size | Search Time/Comm. | Update | Boolean Formula |
|---|---|---|---|---|---|---|---|
| CGKO'06-2 [CGKO11] | Ad | Mm | No | O (Mm) | O(r), O(r) | — | No |
| CK'10 [ ] | Ad | m, n, M | No | O (Mm) | O(r), O(r) | — | No |
| LSDHJ'10[ ] | Ad | n, m | Yes | O (mn) | O(m), O(1) | O (\|Wid\|) | No |
| KPR'12 [KPR12] | Ad(ROM) | n, N | Yes | O (N + n) | O(r), O(1) | — | No |
| KP'13 [KP'13] | Ad(ROM) | m, n | Yes | O (mn) | O((r log g)/p), O(1) | O (\|Wid\| + m log n | No |
| CJJJ+'13-1 [CJJ+14] | NonAd | N | No | O (N) | O(r/P), O(1) | — | No |
| CJJJ+'13-2 [CJJ+14] | Ad | N | No | O (N) | O(r/P), O(r) | — | No |
| CJJJ+'14-1 | NonAd | N | Yes | O (N) | O (r + $d_w$/p) | O (\|Wid\| + | No |

TABLE 1-continued

| Scheme | Security | Leakage | Dyn? | Index Size | Search Time/Comm. | Update | Boolean Formula |
|---|---|---|---|---|---|---|---|
| [CJJ+14] CJJKRS13- OTX [CJJ+13] | Ad | N | No | O (2N) | O(1) O(k · \|DB(w1)\|), O(2) | m log n) — | Conjunctive |
| This work | Ad | n, N | Yes | O ($2^{log\ n+1}$) | =(log n), O(1) | | Conjunctive & Disjunctive |

To summarize, embodiments of the present invention build up a binary tree cryptographic index structure using the key and message homomorphic properties of the encryption scheme. Conventional schemes use a linked list data structure to search for matching files. The key homomorphic properties enable a generation of encryptions under a random key, which can be used as auxiliary help to traverse the binary tree efficiently. As the key is chosen for every search query anew, indistinguishable or in other words randomised tokens, search tokens satisfying a strong privacy notion can be obtained. On the other hand, the decryption keys do not allow to decrypt ciphertexts other than those explicitly generated for.

FIG. 3 shows a cryptographic binary tree data structure. For example each node is associated with the i-th bit of the search word ($w_0, \ldots, w_{n-1}$) is encoded as encryption $C_{i,j}=Enc(k_{i,j}, m_{i,j})$ of the message $m_{i,j}$ under key $k_{i,j}$. The two nodes E1,1, E1,0 in FIG. 3 are then each associated with corresponding buckets comprising files f for the corresponding matched search bits, w=11; 10; 01 or 00. When traversing the tree this leads to a bucket of all files associates with word w. The upper half of FIG. 3 comprises the encrypted data structure, the lower part with the files indices comprises the corresponding buckets.

To summarize, embodiments of the present invention provide an efficient, functional, dynamic, private and communication efficient searchable encryption system.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing encrypted data in a database, performed in a memory available to a computing device, based on a symmetric key and message homomorphic encryption, the database comprising one or more entries, each entry comprising an information identifier and related information, stored information comprising one or more information parts, the information parts being indexed by part index number, the method comprising:
   a) randomly encoding each of the stored information,
   b) adding each of the information parts in each information having a same part index number to a group having the same part index number,
   c) computing a number of secret keys, the number of secret keys being based on the size of an information, greater than the size and smaller than the doubled size,
   d) computing a tree comprising a number of nodes, the number of nodes being the same as the number of computed secret keys in step c) and vertices between the nodes, such that for each node:
      one of the computed secret keys is assigned to the node,
      a tuple of ciphertexts is generated, the number of ciphertexts corresponding to the number of computed secret keys, wherein for providing a ciphertext by encryption, the encryption uses a corresponding secret key and a cleartext common for all nodes, and
      a vertex from the node is assigned to a sibling indexed with the part index number with the information part corresponding to the index number of the node,
   e) computing a master secret comprising all computed secret keys, and
   f) providing the encrypted data in form of a database with tuples comprising the ciphertexts and the groups.

2. A method for searching on encrypted data provided according to the method of claim 1, the method for searching on the encrypted data comprising:
   A) recovering the random encoding of information to be searched,
   B) computing a number of secret keys and a number of ciphertexts, the numbers of secret keys and ciphertexts each being equal to a number of the information parts of the information to be searched, wherein a ciphertext is obtained by encrypting an information part corresponding to a computed secret key with the computed key, such that each ciphertext is based on a different encryption key and a different information part, C) computing in the tree for every node on the path to the group for the searched information an evaluation key by performing a function of a secret key computed in step B) and a secret key computed in c), D) computing a token for each computed ciphertext and each evaluation key comprising the computed ciphertext and the corresponding evaluation key, E) evaluating the corresponding node of the token by computing a second ciphertext, the second ciphertext being computed by performing the function over the corresponding computed ciphertext of step B) and the corresponding computed ciphertext of step d), F) decrypting the information part using the ciphertext of step B) and the secret keys of step B), G) performing steps E) and F) for the next node in the tree having a vertex that is associated with the information part until a group associated to the information searched, is reached, and H) based on the group being reached, retrieving the ciphertexts with matching identifiers.

3. The method according to claim 2, wherein for searching of multiple information in the encrypted data, multiple tokens are computed.

4. The method according to claim 2, wherein for searching of a formula over multiple information first the groups associated with the corresponding information matching every information of the multiple information are identified and then the formula is applied over the indices of the identified groups.

5. A method for updating information of encrypted data provided according to the method of claim 1, the method for updating information of the encrypted data comprising:

1) performing a search in the encrypted data, the search being performed according to the steps:

A) recovering the random encoding of information to be searched,

B) computing a number of secret keys and a number of ciphertexts, the numbers of secret keys and ciphertexts each being equal to a number of the information parts of the information to be searched, wherein a ciphertext is obtained by encrypting an information part corresponding to a computed secret key with the computed key, such that each ciphertext is based on a different encryption key and a different information part, C) computing in the tree for every node on the path to the group for the searched information an evaluation key by performing a function of a secret key computed in step B) and a secret key computed in c), D) computing a token for each computed ciphertext and each evaluation key comprising the computed ciphertext and the corresponding evaluation key, E) evaluating the corresponding node of the token by computing a second ciphertext, the second ciphertext being computed by performing the function over the corresponding computed ciphertext of step B) and the corresponding computed ciphertext of step d), F) decrypting the information part using the ciphertext of step B) and the secret keys of step B), G) performing steps E) and F) for the next node in the tree having a vertex that is associated with the information part until a group associated to the information searched, is reached, and H) based on the group being reached, retrieving the ciphertexts with matching identifiers, and 2) updating of the information by storing an information index for the reached group.

6. The method according to claim 5, wherein information is deleted and the group associated with said the deleted information is deleted.

7. The method according claim 1, wherein one or more dummy indices are added to one of the groups.

8. The method according to claim 1, wherein the tree is a b-tree, or wherein the tree is a binary tree and the cleartext is one bit for step d).

9. The method according to claim 1, wherein step a) is performed by encoding every information as a pseudorandom function with a random seed and the information.

10. The method according to claim 1, wherein step a) is performed using Bloom Filters.

11. The method according to claim 1, wherein locally sensitive hashing is used.

12. A method, performed on a client, for preparing of searching in encrypted data provided according to the method of claim 1, the method comprising:

A) recovering the random encoding of information to be searched

B) computing a number of secret keys and a number of ciphertexts, the numbers of the secret keys and the ciphertexts each being equal to the number of information parts of the information, and wherein a ciphertext is obtained by encrypting an information part with a computed secret key, such that each ciphertext is based on a different encryption key and a different information part, C) computing in the tree for every node on the path to the group for the information an evaluation key by performing a function of a secret key computed in step B) and a secret key computed in c), and D) computing a token comprising the computed ciphertexts and corresponding evaluation keys.

13. A computing device, adapted for providing encrypted data in a database, the database comprising entries, each entry comprising stored information and an information identifier for the stored information, stored information comprising one or more parts, said the information parts having an index number, the computing device being configured to:

a) randomly encode each of the stored information, b) add each of the stored information parts in each information having a same part index number to a group having the same part index number, c) compute a number of secret keys, the number of secret keys being based on the size of an information, greater than the size and smaller than the doubled size, d) compute a tree comprising a number nodes, the number of nodes being the same as the number of computed secret keys in step c) and vertices between the nodes, such that for each node:

one of the computed secret keys is assigned to the node, a tuple of ciphertexts is generated, the number of ciphertexts corresponding to the number of computed secret keys, wherein for providing a ciphertext by encryption, the encryption uses a corresponding secret key and a cleartext common for all nodes, a vertex from the node is assigned to a sibling indexed with the part index number with the information part corresponding to the index number of the node, e) compute a master secret comprising all computed secret keys, and f) provide the encrypted data in form of a database with tuples comprising the ciphertexts and the groups.

14. A system for searching on encrypted data provided according to the method of claim 1, the system comprising a client and a server storing the encrypted data, the client being configured to:
   A) recover the random encoding of information to be searched,
   B) compute a number of secret keys and a number of ciphertexts, the numbers of secret keys and ciphertexts each being equal to the number of information parts of the information to be searched, wherein a ciphertext is obtained by encrypting an information part corresponding to a computed secret key with the computed secret key, such that each ciphertext is based on a different encryption key and a different information part,
   C) compute in the tree for every node on the path to the group for the searched information an evaluation key by performing a function of a secret key computed in step B) and a secret key computed in c),
   D) compute a token for each computed ciphertext and each evaluation key comprising the computed ciphertext and the corresponding evaluation keys;
   E) evaluating the corresponding node of the token by computing a second ciphertext, the second ciphertext being computed by performing the function over the corresponding computed ciphertext of step B) and the corresponding computed ciphertext of step d),
   F) decrypting the information part using the ciphertext of step B) and the secret keys of step B),
   G) perform steps E) and F) for the next node in the tree having a vertex that is associated with the information part until a group associated to the information searched, is reached, and
   H) based on the group being reached, retrieving the ciphertexts with matching identifiers.

15. A non-transitory computer readable medium storing a program causing a computer to execute a method for providing encrypted data in a database, performed in a memory available to a computing device, based on a symmetric key and message homomorphic encryption, the database comprising one or more entries, each entry comprising an information identifier and related information, stored information comprising one or more information parts, the parts being indexed by part index number the method for providing the encrypted data in the database comprising:
   a) randomly encoding each of the stored information,
   b) adding each of the information parts in each information having a same part index number to a group having the same part index number,
   c) computing a number of secret keys, the number of secret keys being based on the size of an information, greater than the size and smaller than the doubled size,
   d) computing a tree comprising a number nodes, the number of nodes being the same as the number of computed secret keys in step c) and vertices between the nodes, such that for each node;
      one of the computed secret keys is assigned to the node,
      a tuple of ciphertexts is generated, the number of ciphertexts corresponding to the number of computed secret keys, wherein for providing a ciphertext by encryption, the encryption uses a corresponding secret key and a cleartext common for all nodes,
      a vertex from the node is assigned to a sibling indexed with the part index number with the information part corresponding to the index number of the node,
   e) computing a master secret comprising all computed secret keys, and
   f) providing the encrypted data in form of a database with tuples comprising the ciphertexts and the groups.

* * * * *